United States Patent
Sun

(10) Patent No.: US 7,040,835 B2
(45) Date of Patent: May 9, 2006

(54) SUPPORT SYSTEM

(76) Inventor: Frank Sun, 1020 S. Corning St., Los Angeles, CA (US) 90035

( * ) Notice: Subject to any disclaimer, the term of this patent is extended or adjusted under 35 U.S.C. 154(b) by 0 days.

(21) Appl. No.: 10/265,126

(22) Filed: Oct. 4, 2002

(65) Prior Publication Data

US 2004/0067098 A1   Apr. 8, 2004

(51) Int. Cl.
*F16B 7/00*   (2006.01)
(52) U.S. Cl. ............... 403/383; 403/230; 403/263; 211/187; 211/189; 108/147.12; 108/156; 108/158.12
(58) Field of Classification Search ............... 403/230, 403/238, 263, 345, 353, 361, 383; 211/187, 211/189, 190; 108/147.12, 147.15, 156, 108/157.16, 158.12; 248/188, 222.41, 223.41, 248/224.8
See application file for complete search history.

(56) References Cited

U.S. PATENT DOCUMENTS

| | | | | |
|---|---|---|---|---|
| 1,793,709 A | * | 2/1931 | Meyers | 108/157.16 |
| 2,272,227 A | * | 2/1942 | Thomas | 428/116 |
| 3,966,340 A | * | 6/1976 | Morris | 403/353 |
| 4,630,982 A | * | 12/1986 | Fenner | 410/102 |
| 6,047,648 A | * | 4/2000 | Alm et al. | 108/157.16 |

* cited by examiner

*Primary Examiner*—Daniel P. Stodola
*Assistant Examiner*—Michael P. Ferguson
(74) *Attorney, Agent, or Firm*—Clement Cheng

(57) ABSTRACT

A support system that can be assembled and disassembled quickly and easily to allow easy mobility and compact storage. The support system comprises of a supported member and a supporting member. The supported member defines two holes that will engage the engagement portion of the supporting member to securely retain the supporting member in desired position and support the supported member.

2 Claims, 4 Drawing Sheets

SUPPORT SYSTEM

BACKGROUND

1. Field of Invention

The present invention relates generally to a support system. More specifically, the present invention relates to a support system that is easily assembled and disassembled. The present invention can be used on tables, chairs, shelves, platforms, and other applications where strong support and quick and easy assembly and disassembly is desired.

2. Description of Related Art

Many different types of supports systems are in use at any given time. Support systems are necessary to support tabletops, chairs, shelves, platforms, and anywhere else that support is required to uphold or maintain the position of an object.

A common type of support system is the fixed support system wherein the supporting member and the object being supported are attached rigidly and permanently to each other. This type of support system is commonly used for tables, chairs, shelves, cabinets, buildings, and where fixed and permanent support is desired.

Another common type of support system uses the flexible support system wherein the supporting member and the object being supported are attached flexibly and semi-permanently to each other. This type of support system is commonly used for vehicle suspension system and anywhere the flexibility and the shock absorbing property of this type of support system are desired.

Yet another type of support system allows a fixed support but the support member can be retracted to allow easier storage or mobility of the object. This type of support system is commonly used for lightweight tables where the legs of the tables are foldable to a position parallel and under the table. This type of support system is also commonly used to support the hoods and tailgates of a vehicle. When the hood or the tailgate of the vehicle is opened, a metal rod is sometimes used to support the hood or the tailgate at a predetermined position. When the hood or the tailgate is closed, the metal rod is folded under the hood or the tailgate.

Another type of support system allows the support member to be completely removed from the object being supported. This type of support system has the benefit of reducing the total weight of the object to allow easy movement of the separate members. This type of support system also has the advantage of compact dimensions when the support members are removed from the object being supported to allow easy storage and transportation. Another advantage of this support system is that it can support relatively heavy objects compared to the retractable support system. This type of support system can be used to support heavy tables, chairs, shelves, platforms, and other applications where a strong support, ability to be disassembled, mobility, or compact storage is desired.

SUMMARY OF THE INVENTION

The present invention is a support system that can be assembled and disassembled quickly and easily to allow easy mobility and compact storage. The support system comprises of a supported member and a supporting member. The supported member defines two holes that will engage the engagement means in the supporting member to securely retain the supporting member in desired position and support the supported member.

DETAILED DESCRIPTION OF THE PREFERRED EMBODIMENT

Figure 1:
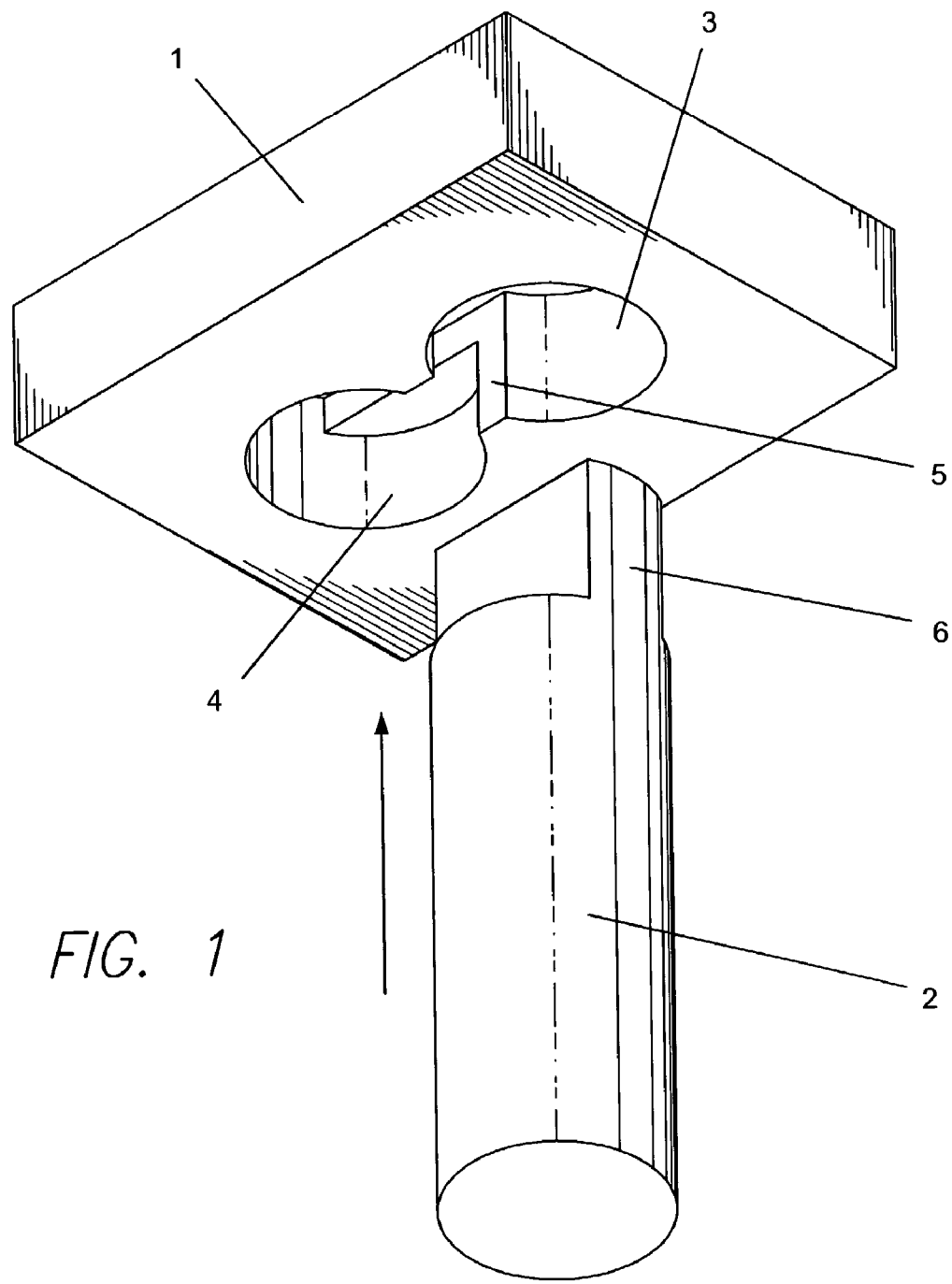
FIG. 1 shows the support system disassembled and ready for assembly.
Figure 2:
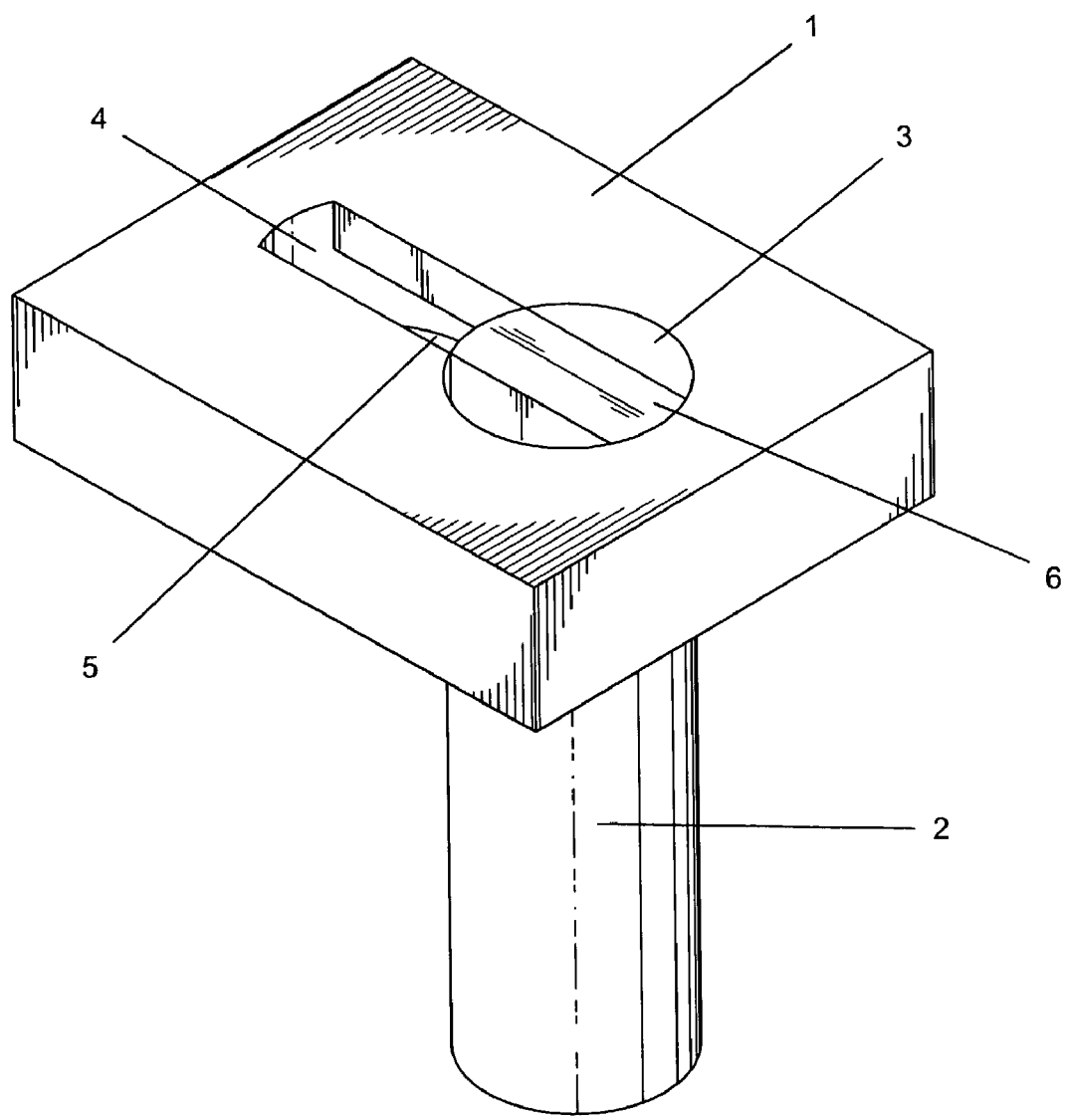
FIG. 2 shows an intermediate step in the assembly of the support system.
Figure 3:
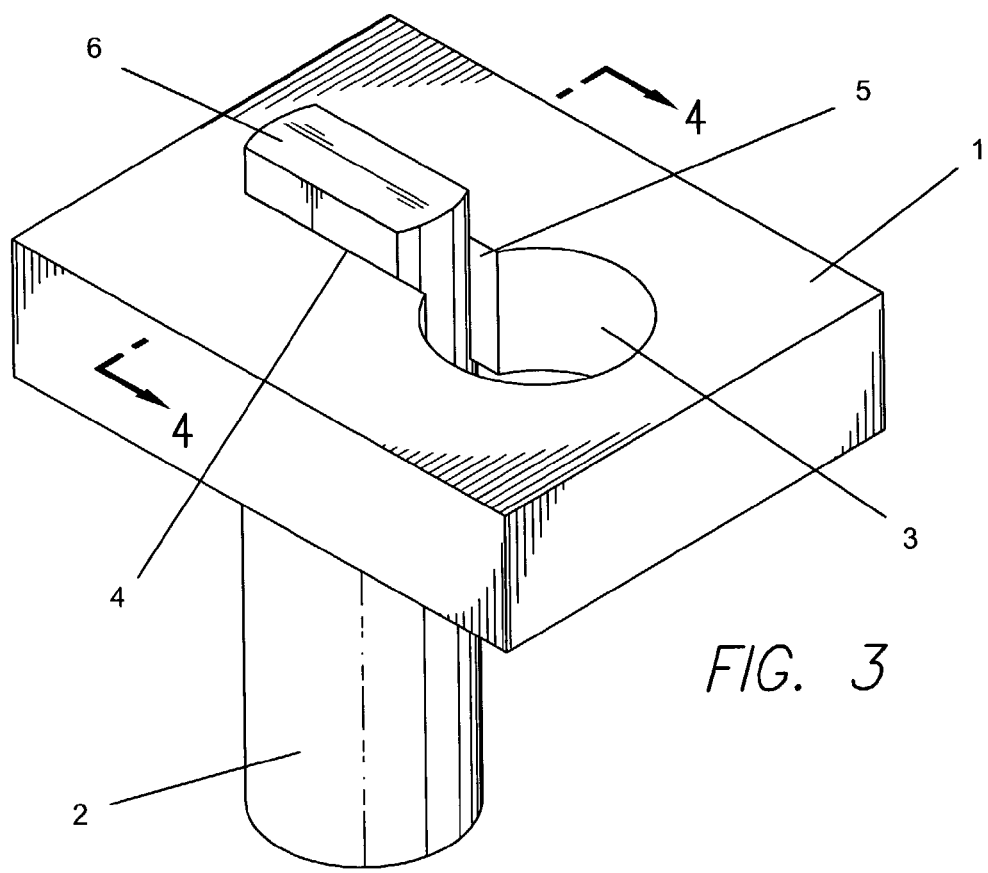
FIG. 3 shows the final assembled state of the support system.
Figure 4:
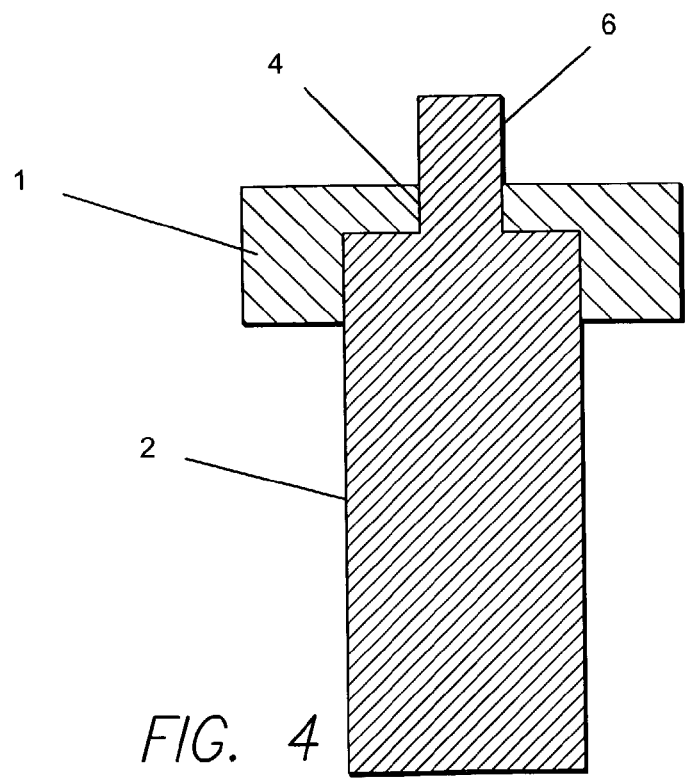
FIG. 4 shows a cross-sectional view of the support system fully assembled.

The preferred embodiment of the present invention is a support system that can be assembled and disassembled quickly and easily to allow easy mobility and compact storage. As shown in FIG. 1, the preferred embodiment comprises of a supported member 1 and a supporting member 2. The supported member 1 defines two holes 3, 4 adjacent to each other with a channel 5 between the two holes 3, 4. The first hole 3 has a constant profile and dimension through the supported member 1. The second hole 4 has the same constant profile and dimension as the first hole 3 only partially through the supported member 1. The remaining length of the second hole 4 has the same profile and dimension as the engagement means 6 of the supporting member 2. The supporting member 2 has the same general constant profile and general dimension as the first hole 3. One end of the supporting member 2 has engagement means 6 in the form of a protrusion with a smaller profile and dimension than the remainder of the supporting member 2. As shown in FIG. 2, the supporting member 2 can be inserted into the first hole 3 and slide into the second hole 4 through the channel 5 between the two holes 3, 4, as shown in FIG. 3. As shown in FIG. 4, the engagement means 6 in the supporting member 2 will engage the second hole 4 and lock the supporting member 2 into position to allow the supporting member 2 to support the supported member 1. This embodiment of the support system is well suited for support of horizontal planar members such as table tops.

Figure 5:
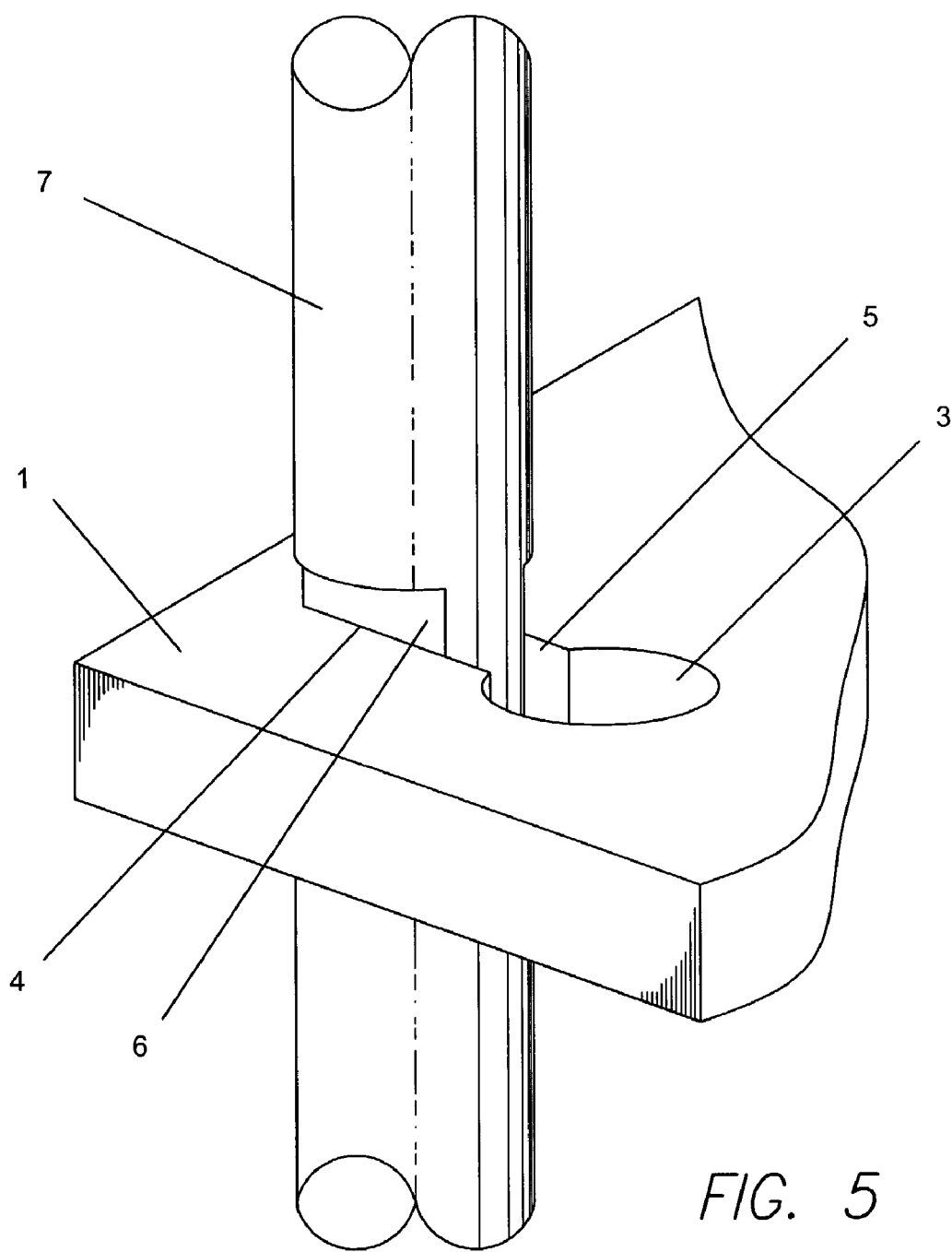
FIG. 5 shows another embodiment of the support system fully assembled.

Another embodiment of the supporting system is shown in FIG. 5 and utilizes the same supported member 1 but has the engagement means 6 located between the ends of the supporting member 2. In this configuration, the supporting member 2 is inserted through the first hole 3 until the engagement means 6 reaches the first hole 3. The supporting member 2 is then slid into the second hole 4 through the channel 5 to lock into position. The supporting member 2 may have multiple engagement means 6 located along its length to allow the supported member 1 to be supported at different heights relative to the supporting member 2. This embodiment is particularly suite for shelving support systems because it allows the shelves to be adjustable to different heights.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A support system for supporting horizontal planar members that can be assembled and disassembled quickly and easily to allow easy mobility and compact storage, the support system comprising:
   a. a supported member having a thickness; and
   b. a supporting member having an engagement means;
   c. two adjacent holes defined in the supported member; wherein a first hole has a constant profile and dimension extending through the entire thickness of the supported member and a second hole has a first portion having the same constant profile and dimension as the first hole extending a length only partially through the thickness of the supporting member, and a second portion having the same profile and dimension as the engagement means of the supporting member extending through the remaining length of the thickness of the supported member, wherein the supporting member has the same general constant profile and general dimension as the first hole,
   d. a channel defined between the two holes; wherein one end of the supporting member has engagement means in the form of a protrusion with a smaller profile and dimension than the remainder of the supporting member, wherein the supporting member can be inserted into the first hole and slide into the second hole through the channel between the two holes; wherein the engagement means of the supporting member will engage the second portion of the second hole and lock the supporting member into position to allow the supporting member to support the supported member.

2. The support system of claim 1 wherein the engagement means is a rectangular tab fitting into a slot in the second portion of the second hole, wherein the tab protrudes through the surface of the supported member.

* * * * *